L. F. Hobbs,
Spool Holder.
No. 81,504. Patented Aug. 25, 1868.

Witnesses:
Harry King
Leopold Query

Inventor:
Lewis F. Hobbs
by Alexander Mason
Atty

United States Patent Office.

LEWIS F. HOBBS, OF QUINCY, MASSACHUSETTS.

Letters Patent No. 81,504, dated August 25, 1868.

IMPROVEMENT IN DEVICES FOR HOLDING SPOOLS OF THREAD.

The Schedule referred to in these Letters Patent and making part of the same.

TO ALL WHOM IT MAY CONCERN:

Be it known that I, LEWIS F. HOBBS, of Quincy, in the county of Norfolk, and in the State of Massachusetts, have invented certain new and useful Improvements in "Spool-Holders;" and do hereby declare that the following is a full, clear, and exact description thereof, reference being had to the accompanying drawings, and to the letters of reference marked thereon.

My invention consists in a spool-holder formed by bending a piece of wire in such a form as to provide a retaining-pin and socket for its end, an axle for the spool, and a holder for the end of the axle, to prevent the spool from falling off, and an eyelet or thread-guide, thus forming a simple and complete article, which can easily be fastened to the dress.

In order to enable others skilled in the art to make and use my invention, I will now proceed to describe its construction and operation, referring to the annexed drawings, which form a part of this specification, and in which—

Figure 1:
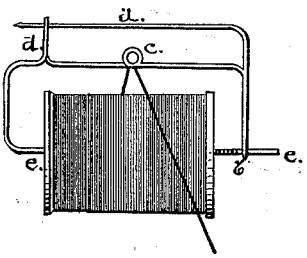

Figure 1 is a front view, and

Figure 2:
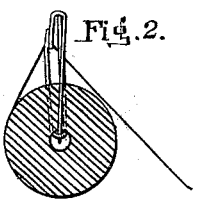

Figure 2 a side view.

Take a piece of wire, of any material desired, that has sufficient spring to it. Begin with the pin $a$, which in the drawings is represented as horizontal, allow the required length, which will correspond with size of spool-holder. The wire is bent downward, so as to form nearly a right angle, being perpendicular to the pin $a$, and of a height that depends upon size of spool to be used. It is then turned back parallel to the perpendicular side, forming at its lower end a security, $b$, for the end of the axle.

A little below the horizontal pin $a$, another bend is made, and the wire runs parallel to said pin. An eyelet, $c$, is made, and three short bends, an upward, inward and downward, and horizontal, making a socket, $d$, for the end of the pin.

The wire is then bent perpendicularly downward and horizontally inward, forming the axle $e$ for the spool, which axle rests in the bend $b$, and the spool-holder is complete.

The end of the axle $e$ may be either straight, bent, or in any shape desired.

Having thus fully described my invention, what I claim as new, and desire to secure by Letters Patent, is—

A spool-holder formed of wire, and provided with the axle $e$, holder $b$, thread-guide $c$, retaining-pin $a$, and socket or eye $d$, the whole arranged and operating substantially as herein set forth.

In testimony that I claim the foregoing, I have hereunto set my hand, this sixth day of July, 1868.

LEWIS F. HOBBS.

Witnesses:
WM. B. DUGGAN,
R. AUGUSTUS DUGGAN.